United States Patent [19]

Inoue

[11] Patent Number: 4,674,620
[45] Date of Patent: Jun. 23, 1987

[54] METHOD OF POSITIONING PALLETS AND DEVICE THEREOF

[75] Inventor: Toshiaki Inoue, Tokyo, Japan

[73] Assignee: Sanshin Shokai Co. Ltd., Tokyo, Japan

[21] Appl. No.: 715,452

[22] Filed: Mar. 25, 1985

[51] Int. Cl.$^4$ .............................................. B65G 47/00
[52] U.S. Cl. .................. 198/345; 198/464.2; 198/465.1; 198/468.8
[58] Field of Search .................. 198/465.1, 345, 339.1, 198/346.1, 465.2, 464.2, 468.8, 803.2; 29/33 P, 563, 568

[56] References Cited

U.S. PATENT DOCUMENTS

| | | | |
|---|---|---|---|
| 2,903,120 | 9/1959 | Thomas | 198/465.2 |
| 3,010,371 | 11/1961 | Riedel et al. | 198/465.2 |
| 3,527,087 | 9/1970 | Converse, III et al. | 198/346.1 |
| 3,690,433 | 9/1972 | Buldini | 198/345 |
| 3,825,245 | 7/1974 | Osbum et al. | 29/563 |
| 4,014,428 | 3/1977 | Ossbahr | 198/345 |
| 4,172,512 | 10/1979 | Clegg et al. | 198/346.1 |
| 4,209,898 | 7/1980 | Aoki et al. | 198/345 |
| 4,423,806 | 1/1984 | Ogasawara | 198/465.1 |
| 4,583,631 | 4/1986 | Yonezawa et al. | 198/345 |

FOREIGN PATENT DOCUMENTS

| | | | |
|---|---|---|---|
| 53-145278 | 12/1978 | Japan | 198/465.2 |
| 57-38205 | 3/1982 | Japan | 198/345 |
| 1387387 | 3/1975 | United Kingdom | 198/464.2 |
| 2,124,942 | 2/1984 | United Kingdom | 29/563 |

Primary Examiner—Robert J. Spar
Assistant Examiner—Lyle Kimms
Attorney, Agent, or Firm—Schwartz & Weinrieb

[57] ABSTRACT

An apparatus and a method of positioning pallets on roller chains mounted on a free flow conveyor is basically composed of a detector for detecting an oncoming pallet, a stopper for stopping the pallet at an approximately required position, a controller capable of positioning the pallet in the x- and y-directions, and another controller capable of positioning the pallet in the z-direction. With an application of the foregoing method proposed, a device is designed to provide a highly accurate positioning of the pallet with a single device and therefore contributes greatly to an economization of operating costs.

20 Claims, 7 Drawing Figures

METHOD OF POSITIONING PALLETS AND DEVICE THEREOF

BACKGROUND OF THE INVENTION

1. Field of the Invention

This invention relates to methods of and apparatus for positioning pallets, and more particularly to a method of and apparatus for positioning a pallet whereby the pallet disposed upon the roller chains of a horizontally disposed free flow conveyor is able to be stopped at a required position with a high degree of accuracy.

2. Description of the Prior Art

In a production or an assembly line of electrical parts, conventionally, the free flow conveyor has favorably been put into practical use. This horizontally disposed free flow conveyor mounted upon a conveyor frame consists of a large number of pallets which are freely loaded on endlessly circulating roller chains, and feeds in order a printed circuit board for electrical parts held on a pallet toward a work station, where every pallet is securely stopped at a required position before automatic insertion of electrical parts with the aid of an inserter or other similar devices is generally performed.

Figure 1:
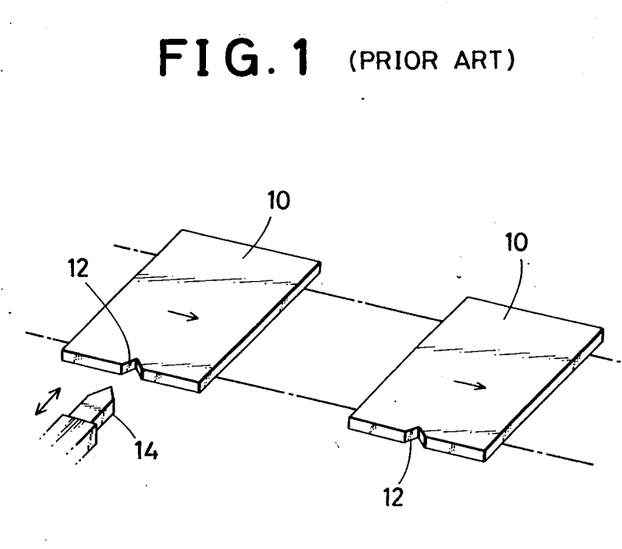
FIG. 1 is a schematic view of the pallet positioning device of the prior art.

The prior art free flow conveyors, however, have demonstrated substantially great technical difficulties in their positioning operations to securely stop the pallet at the required position. And to minimize this difficulty various devices or systems have been brought forward. For example, a device for positioning a pallet in x- and y-directions, as shown in FIG. 1, was proposed to fit a wedge-shaped stopper 14 into a triangular notch 12 cut away on one side edge of a pallet 10. But this device contained disadvantages in requiring intricate mechanisms as well as installation costs because another arrangement was required to control the height in the z-direction. Such being the case with the conventional pallet positioning device, as a result of incorporating an independently driving mechanism requisite for x-, y-, and z-dirctions respectively, the positioning operation must be performed with a two-step action cycle, and thus another disadvantage existed in taking much time for positioning the pallet.

OBJECTS OF THE INVENTION

Accordingly, it is an object of the present invention to eliminate the above-described disadvantages accompanying the previously known devices, namely, not only to securely obtain highly accurate positioning of a pallet with one-step action but to provide a method of positioning the pallet and a novel device therefor capable of shortening the cycle time as well.

SUMMARY OF THE INVENTION

In accordance with the present invention, to attain this object, the method of positioning the pallet is characterized by which: an oncoming pallet on a free flow conveyor fed at an indefinite interval is previously détected; the pallet is stopped by means of a stopper at an approximately required position on the conveyor; both x- and y-directions are controlled by means of the elevation of an elevating plate mounted under the required position of the pallet while respectively fitting two or more protruding pieces providing upon the upper side of the plate into bores of flanged members provided upon the underside of the pallet; and the z-direction is also controlled by contact mating of the edges of the flanged members by means of the elevation of the pallet together with the elevating plate against detent block members securely mounted at a required height.

To perform the above-described method of positioning, in the free flow conveyor feeding in order the pallet for work loading, the favorably applied device particularly comprises: a base bridged between an oppositely disposed pair of conveyor frames; a horizontally disposed support plate mounted through means of support members above the base; an air cylinder suspendingly mounted from the lower side of the support plate and having an upwardly extending piston rod extending through a central aperture provided within the support plate; required-height detent block members mounted on the upper side of the support plate upon opposite sides of the center line of the pallet flow; an elevating plate secured onto the piston rod of the air cylinder so as to be vertically movable in a contact-free mode with respect to the detent block members; two or more protruding pieces which are used for positioning the pallet in both the x- and y-directions are secured on the upper side of the elevating plate; flanged members having bores for mating with the protruding pieces and positioning the pallet in the z-direction by contacting the detent block members; a sensor for detecting an approaching pallet; and a stopper for stopping the pallet at the approximately required position by contact with the flanged members mounted on the pallet.

BRIEF DESCRIPTION OF THE DRAWINGS

The various features and novelty which characterize the present invention are pointed out with particularity in the claims annexed to and forming a part of this specification. For a better understanding of the invention, its positioning advantages, and specific objects attained by its method, reference should be had to the accompanying drawings. and descriptive matters in which there are illustrated and described preferred embodiments of the present invention, wherein:

DETAILED DESCRIPTION OF THE INVENTION

With specifiic reference to the form of the invention illustrated in the drawings, the numeral 16 indicates in general the two horizontally disposed conveyor frames installed in a laterally spaced parallel mode with respect to each other so as to leave a required spacing therebetween upon each of which roller chains 18 are provided in upper and lower flights so as to endlessly circulate and run forwardly and backwardly. A large number of rectangular pallets 20 are freely loaded upon the roller chains 18 mounted upon the pair of opposite frames 16, and are transported in the horizontal direction along the frames 16 as the roller chains 18 circulate and operate.

Figure 2:
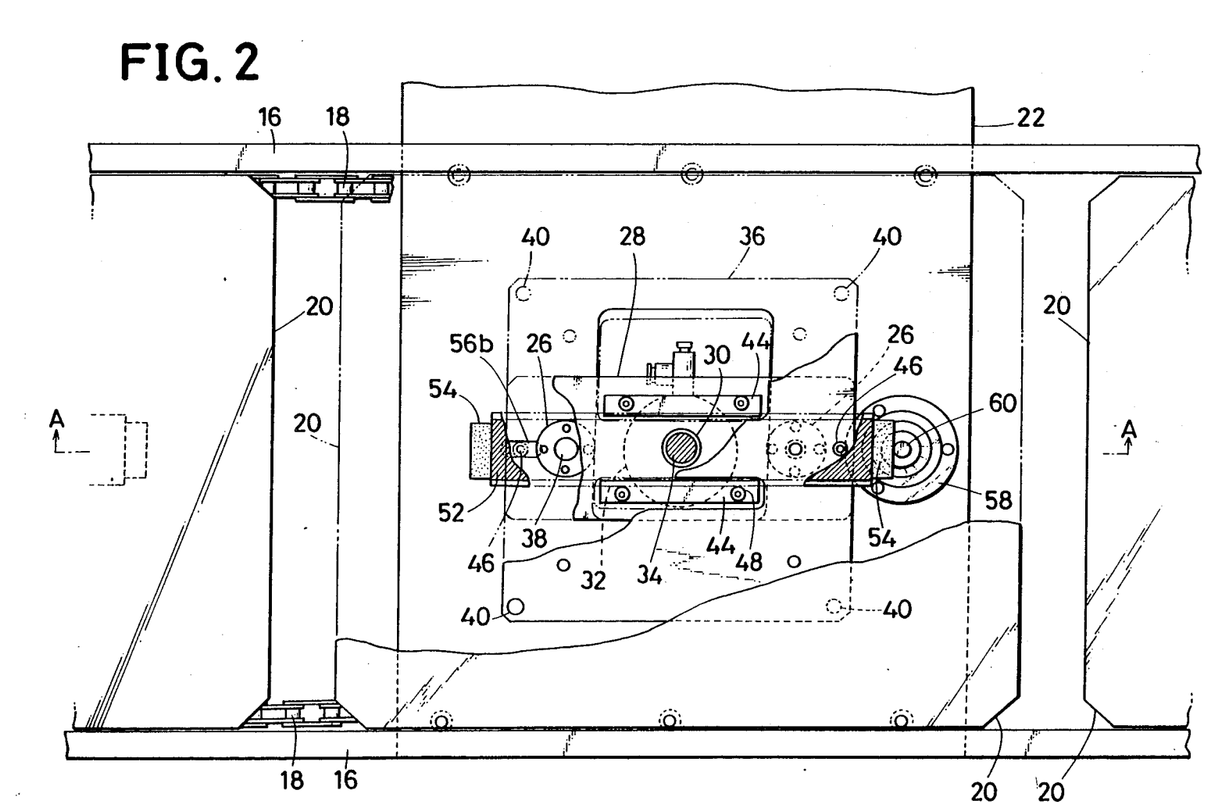
FIG. 2 is a schematic top view of the pallet positioning device of the present invention.

The pallet positioning device according to the present invention, as shown in FIG. 2, is provided in the required location of the frames 16, corresponding to which the work station, not shown, is installed on the side of the frames 16. A suitable inserter or an automatic inserting machine for electrical parts is, for example, provided at the work station, which is, of course, available for manual operations as a working table.

Figure 4:
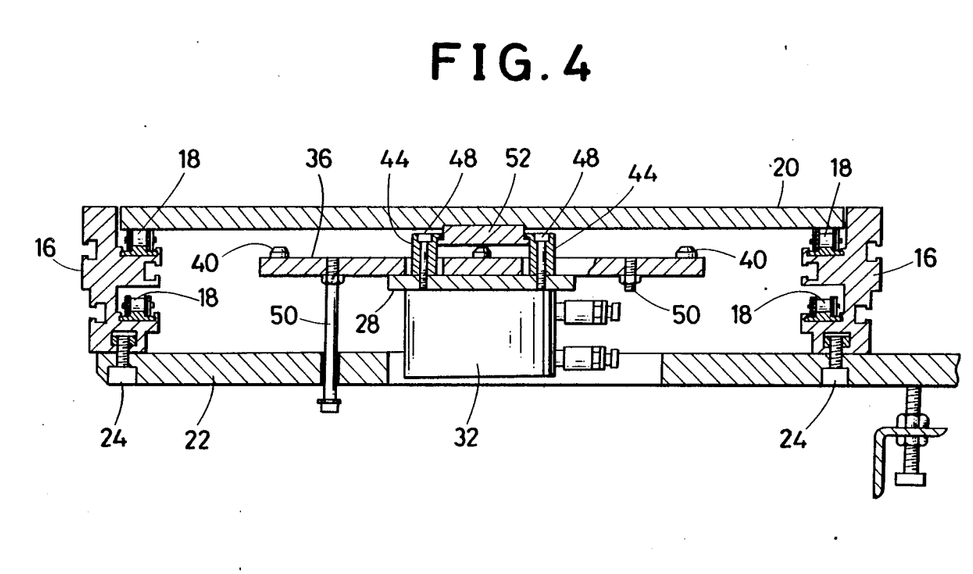
FIG. 4 is a side view taken in the direction of flow in FIG. 2.

Below the pair of frames 16, as shown in FIG. 4, there is provided a base piece 22 which is installed, at right angles with respect to the direction of the conveyor flow, by means of bolts 24. At an approximately central part of the base 22, there is provided a rectangular bore within which an air cylinder 32, more particularly described hereinafter, is disposed. Above the base 22, a pair of vertically extending cylindrical support members 26 are installed so as to be disposed upon opposite sides of the bore, as shown in FIG. 2, and a horizontally disposed oblong support plate 28 is secured to the upper ends of the cylindrical support members 26. A round aperture 30 is bored within the central part of the support plate 28, the upper end of the extremely small stroke air cylinder 32 (so-called mini cylinder) being in contact with the underside of plate 28, and secured to plate 28, while the piston 34 extends upwardly within aperture 30.

Above the support plate 28, there is provided a rectangular elevating plate 36 which reciprocates upwardly and downwardly with a required stroke. Along the central axes of the pair of support members 26, there is respectively provided a bore of required diameter in which pins 38 are respectively inserted so as to be free sliding therewithin, and the elevating plate 36 is fixedly secured to the top of each pin 38, plate 36 being additionally secured to the free end of the piston rod 34 by suitable fixing means, not shown. Thus, the pins 38 disposed within the bores of the support members 26 function not only as guides which can smoothly guide the elevating plate 36 when the same is elevated above the support plate 28 but also serve as stoppers which can prevent the elevating plate 36 from swivelling with respect to the support plate 28.

Next, within the vicinity of each corner on the upper surface of the elevating plate 36, four protrusions 40, as described hereinafter, are respectively provided to receive a vertical load. Further, the elevating plate 36, as shown in FIG. 5, is provided with two rectangular bores 42 which are disposed upon opposite sides of the central axis line of the conveyor flowpath, and detent block members 44, having an L-shaped cross-section, pass through the bores 42.

Figure 5:
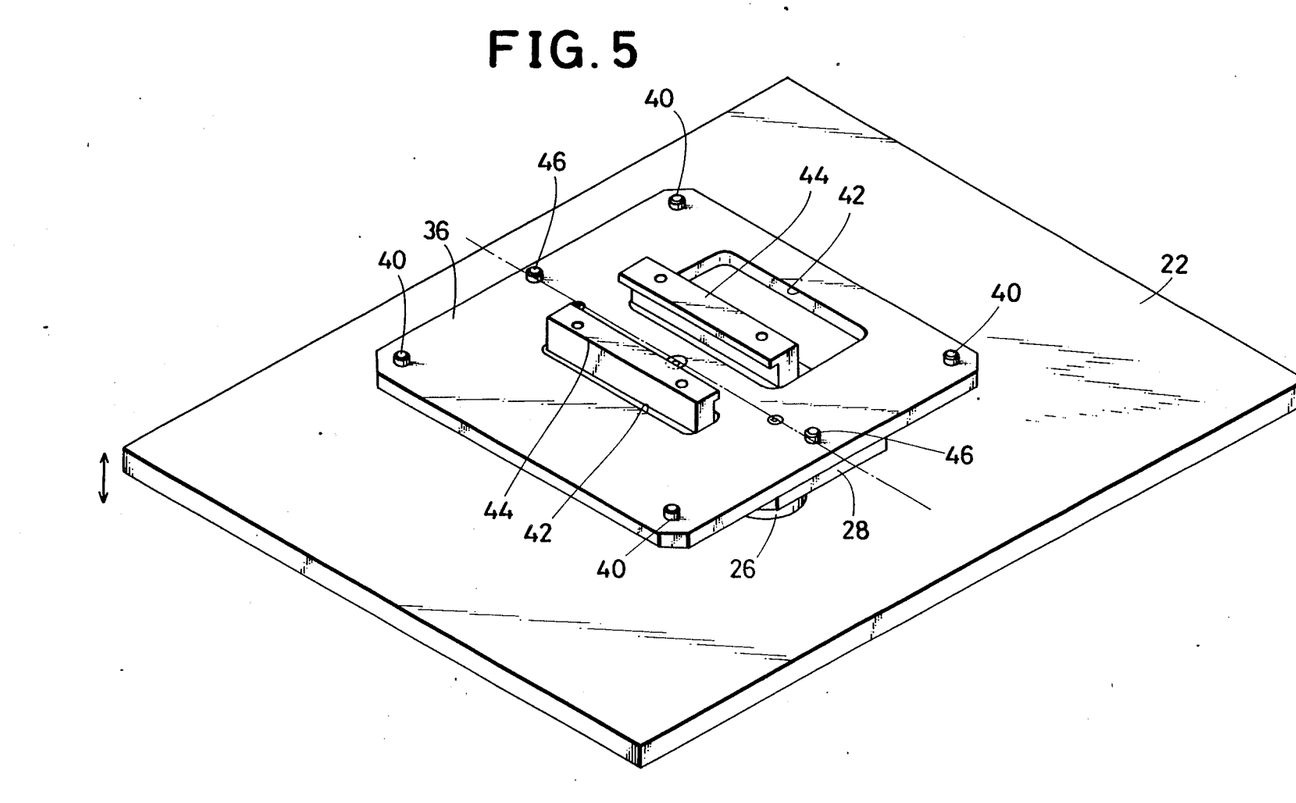
FIG. 5 is a perspective view of the face of the elevating plate.
Figure 6:
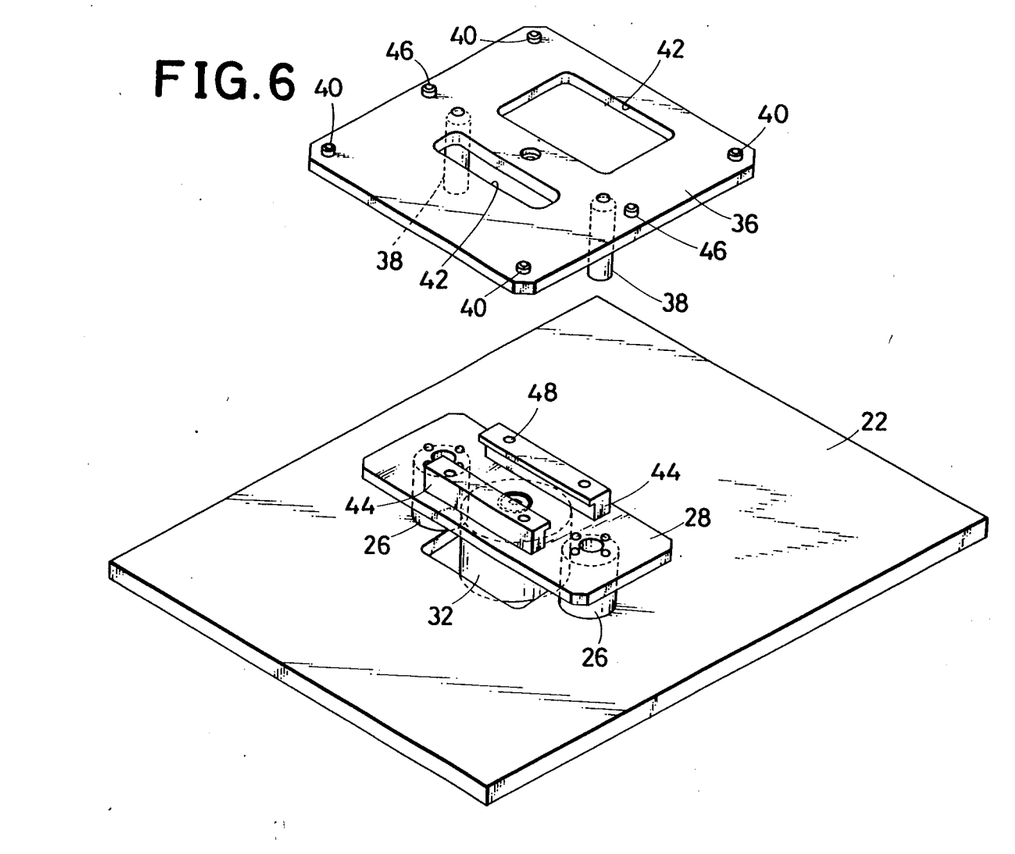
FIG. 6 is an exploded view in perspective of the relation between the support plate mounted on the base and the elevating plate driven up and down by the air cylinder located thereabove.

As shown in FIG. 5, along the central axis line of the elevating plate 36, at least two protruding pieces 46, which position the pallet 20 in the x- and y-directions, as described hereinafter, are respectively secured to the upper surface of elevating plate 36 with a predetermined spacing therebetween.

On the upper surface of the support plate 28, as shown in FIG. 4, two detent block members 44, having an inverted L-shaped cross-section, are mounted upon opposite sides of the central axis line in the direction of the conveyor flow and also at the required height by means of bolt members 48. And, as shown in FIG. 5, the elevating plate 36 is freely disposed about each of the detent block members having the inverted L-shaped section through means of the two bores 42, and is provided with the piston rod 34 of the air cylinder 32. Thus, when the air cylinder 32 is energized, the piston rod 34 will be extended out of the cylinder 32 and the elevating plate 36 will be elevated by the required stroke, however, the bores 42 are sufficiently large with respect to the detent block members 44 so as to freely pass therearound whereby plate 36 and blocks 44 do not interfere with each other. And, as described above, the two pins 38 which are inserted into the support member 26 so as to be free sliding therewithin can allow the elevating plate 36 to be controlled in the x- and y-directions and be smoothly elevated in a linear manner without pivoting or rotating. As shown in FIG. 4, the elevating plate 36 is also provided with additional guiding members 50 which pass perpendicularly through the base 22 so as to be free sliding therethrough.

Figure 7:
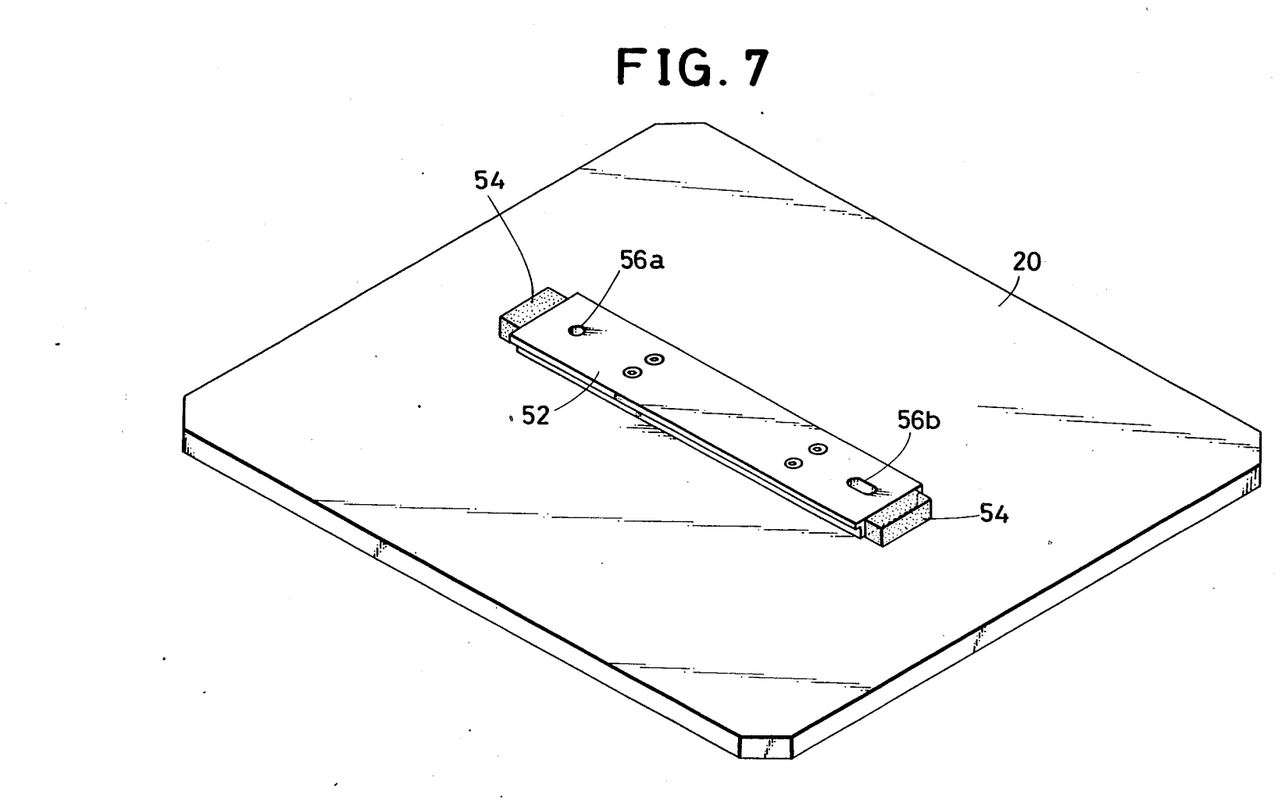
FIG. 7 is a schematic view in perspective of the underside of the pallet used in the device of the invention.

In view of the device according to the present invention, a mechanism which is fitted into the detent block members 44 having the inverted L-shaped cross-section is incorporated into the pallet 20, which will be apparent by reference to the following description which discloses further details taken in connection with the accompanying FIG. 7. FIG. 7 is a schematic view in perspective of the underside of the rectangular pallet 20 used in a free flow conveyor, and the flanged members 52 having horizontally extending sides are fixedly secured to pallet 20 along its central axis line with respect to the flow direction of the pallet 20. The buffer pieces 54 comprising highly elastic materials like urethane are respectively attached to both front and rear ends of the flanged members 52, as viewed in the direction of flow of the pallet 20, and there is provided upon the underside of each member 52 a round bore 56a and an oval bore 56b, which are respectively bored thereon so as to have a required spacing therebetween along the central axis line of member 52. The distance between round bore 56a and oval bore 56b is predeterminedly set, so that the distance may be the same as the protruding pieces 46 for positioning the pallet 20 in the x- and y-directions and which, as described above by reference to FIG. 5, extend out from the surface of the elevating plate 36. As shown in FIG. 4, when the pallet 20 supported by the roller chains 18 comes within the vicinity of the work station, the horizontally projecting flanges of the flanged members 52 which are provided upon the underside of the pallet 20 are predeterminedly sized, so that both sides can be smoothly inserted into and pass through the L-shaped regions of the detent block members 44 having the inverted L-shaped cross-sections.

Figure 3:
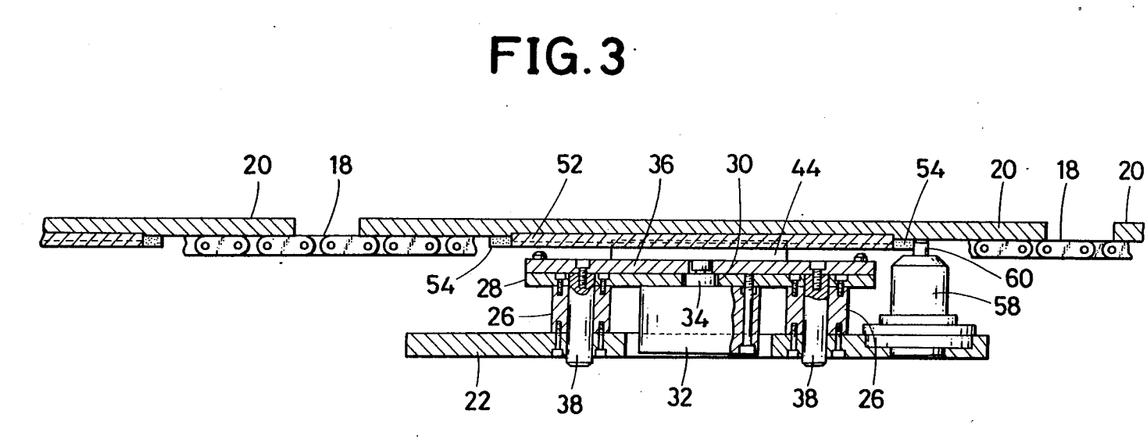
FIG. 3 is a cross-section taken on line A—A in FIG. 2.

Referring next to FIG. 3, on the upper side of the base 22, there is provided another air cylinder 58 having a configuration as illustrated, and the end of the piston rod 60 which belongs to air cylinder 58 is sized, so that the end may be located slightly below the underside of pallet 20 as well as above the underside of the flanged members 52 when the cylinder is energized, whereby the urethane pieces 54 will be in contact with the end of the rod 60, as illustrated in the drawing. When the air cylinder 58 is reversely energized, the rod 60 will retract into the cylinder 58 and, accordingly, it is apparently understandable that the rod 60 is released from contact with the urethane pieces 54, or in other words, the function as a stopper is complete.

In the next place, the operation and effect of the pallet positioning device in view of the foregoing description of the present invention will be described. In the free flow conveyor, for example, works such as printed circuit boards for tape recorders, not shown, are loaded upon the pallet 20 and fed in order toward the work station as the roller chains 18 operate. When the corresponding pallet 20 comes within the vicinity of the required position on the work station, the pallet 20 is detected with the air of the required detecting arrangements such as a photodelectric switch, or the like, not shown, which transmits a signal to the air cylinder 58 for operation as a stopper; whereby the piston rod 60 is energized so as to extend upwardly by the required stroke and, consequently, the pallet 20 fed on the free flow conveyor is stopped as a result of contact of the urethane pieces 54 provided upon the ends of the flanged members 52 with the piston rod 60.

In consequence of the foregoing actions, the air cylinder 32, which is provided for elevating the plate 36 upwardly and downwardly and which is provided on the support plate 28, is energized, and the piston rod 34 extends and elevates the elevating plate 36 by the required distance. At this time, one of the two protruding pieces 46 which extend out from the upper surface of the elevating plate 36 is fitted into the round bore 56a provided on the flanged member 52, and the other piece 46 is fitted into the oval bore 56b, whereby the pallet 20 is now accurately positioned in both the x- and y-directions. The reason the oval bore 56b is provided so as to be different in shaped from the round bore 56a is to slightly accommodate longitudianl play for only one bore, by which the protruding pieces 46 are respectively fitted easily and securely into the mating bores when the elevating plate 36 is elevated.

In this manner, the pallet 20 is allowed to be stopped at the approximately required position by means of the piston rod 60 acting as a stopper in the state that the flanged members 52 move relative to detent block members 44, and as the elevating plate 36 is elevated, the x- and y-positions of the plate 36 are enabled to be achieved by fitting the protruding pieces 46 respectively into both the round and oval bores, and therefore, the pallet 20 is finally positioned with a high degree of accuracy at the required position of the work station.

With the pallet 20 elevated by the elevating plate 36, the z-direction of the pallet 20 can be controlled through means of the contact of the flanged edges of the flanged members 52 with the inwardly extending leg portions the detent block members 44. The reasons why the four protrusions 40 are respectively provided upon each corner of the elevating plate 36 are that when the elevating plate 36 is reciprocated upwardly and downwardly, the vertical load of the pallet which is loaded with works or devices may be supported by the four protrusions directly in contact with the underside of the pallet 20, and that the pallet 20 may be prevented from sliding in a side-wise direction.

Referring to the foregoing description of the present invention, the method of positioning the pallet and the device thereof provide a secure and highly accurate positioning of the pallet on the conveyor line with a single action by which the cycle time can be shortened. Since the base 22 which supports the proposed positioning device is solely secured on the lower end of the frames 16 by means of the bolts 24, the base can be freely moved along the direction of the conveyor line with the bolts removed. Accordingly, the optimum location suitable for the work station can be freely varied to satisfy the requirements of field-proven FMS (Flexible Manufacturing System) methods.

Although the invention has been described in its preferred method of positioning the pallet and device thereof with reference to the drawings, it is to be understood that the invention is not limited to the specific embodiments thereof except as defined in appended claims but many apparently widely different embodiments of this invention may be made without departing from the spirit and scope thereof.

What is claimed is:

1. Apparatus for positioning a pallet on a conveyor, comprising:
    a stationary conveyor frame;
    movable conveying means supported upon said conveyor frame for transporting said pallet along a conveyor path;
    means disposed upon said conveyor frame for stopping the movement of said pallet at a predetermined position along said conveying path;
    elevating plate means engageable with said pallet and vertically movable relative to said conveyor frame for elevating said pallet in a vertical Z direction;
    means defined between said elevating plate means and said pallet for fixing said pallet relative to said elevating plate means in both horizontal X and Y planar directions upon engagement of said elevating plate means with said pallet; and
    means fixedly mounted upon said conveyor frame and projecting upwardly through said elevating plate means so as to be engageable with said pallet for limiting the vertical movement of said pallet in said Z direction by said elevating plate means,
    whereby said pallet is capable of being accurately positioned upon said conveyor within all three X, Y, and Z directions.

2. Apparatus as set forth in claim 1, wherein:
    said movable conveying means comprises roller chains.

3. Apparatus as set forth in claim 1, wherein said pallet stopping means comprises:
    a pneumatic piston-cylinder assembly engageable with a front end portion of said pallet and mounted upon said conveyor frame.

4. Apparatus as set forth in claim 1, wherein said X and Y fixing means comprises:
    a pair of longitudinally spaced bores defined within the underside of said pallet; and
    a pair of longitudinally spaced protrusions disposed upon the upper surface of said elevating plate means for disposition within said bores of said pallet.

5. Apparatus as set forth in claim 4, further comprising:
    a flanged plate fixedly secured to the undersurface of said pallet; and
    said longitudinally spaced bores are defined within said flanged plate.

6. Apparatus as set forth in claim 5, wherein:
    said means for limiting the vertical movement of said pallet in said Z direction comprises a pair of substantially inverted L-shaped brackets for engaging said flanged plate of said pallet.

7. Apparatus as set forth in claim 6, wherein:
    said pair of brackets are disposed upon opposite sides of the central axis of said conveyor path.

8. Apparatus as set forth in claim 5, wherein:
    said bores and said protrusions are disposed along the central axis of said conveyor path.

9. Apparatus as set forth in claim 6, further comprising:
bore means defined within said elevating plate means for permitting said substantially inverted L-shaped brackets to pass therethrough in a non-interfering manner.

10. Apparatus as set forth in claim 1, further comprising:
pneumatic piston-cylinder means for actuating said elevation plate means.

11. Apparatus as set forth in claim 1, further comprising:
support means extending vertically upwardly from said conveyor frame;
bore means defined within said support means; and
guide pin means dependently supported from said elevating plate disposed within said bore means of said support means for guiding said elevating plate during its vertical movements.

12. A method of positioning a pallet on a conveyor, comprising the steps of:
conveying a pallet along a conveying path of said conveyor;
stopping said pallet at a predetermined position along said conveying path;
providing an elevating plate engageable with said pallet and vertically movable relative to said conveyor for elevating said pallet in a vertical Z direction;
providing means upon said elevating plate and said pallet for fixing said pallet relative to said elevating plate in both horizontal X and Y planar directions upon engagement of said elevating plate with said pallet;
providing means fixedly mounted upon said conveyor and projecting vertically upwardly through said elevating plate so as to be engageable with said pallet for limiting the vertical movement of said pallet in said vertical Z direction when said elevating plate elevates said pallet;
elevating said elevating plate a first predetermined amount such that said fixing means of said elevating plate and said pallet become engaged so that movement of said pallet in said X and Y directions relative to said elevating plate is prevented; and
elevating said elevating plate an additional second predetermined amount until said pallet engages said vertical movement limiting means so that further movement of said pallet in said Z direction relative to said conveyer is prevented,
whereby said pallet is capable of being accurately positioned upon said conveyor within all three of said X, Y, and Z directions.

13. A method as set forth in claim 12, wherein:
said conveying of said pallet along said conveying path is achieved by roller chains.

14. A method as set forth in claim 12, wherein:
said stopping of said pallet at said predetermined position along said conveying path is achieved by a penumatic pistoncylinder assembly encountering the forward leading edge portion of said pallet.

15. A method as set forth in claim 12, wherein:
said elevation of said elevating plate is achieved by a pneumatic piston-cylinder assembly.

16. A method as set forth in claim 12, wherein said fixing of said pallet relative to said elevating plate in said X and Y directions is achieved by the steps of:
providing bores, spaced in the longitudinal direction of flow of said pallet along said conveyor path, within the undersurface of said pallet; and
providing upstanding protrusions upon said elevating plate at longitudinally spaced locations which substantially match said longitudinal spacing of said pallet bores for mating with said pallet bores.

17. A method as set forth in claim 12, wherein said limiting of the vertical movement of said pallet in said vertical Z direction is achieved by the steps of:
providing bores within said elevating plate; and
disposing substantially inverted L-shaped brackets, mounted upon said conveyor, upwardly through said bores of said elevating plate for engaging said pallet.

18. A method as set forth in claim 17, further comprising the steps of:
providing a flanged plate upon the underside of said pallet; and
disposing said brackets upon opposite sides of the central axis of said conveyor path for engaging opposite flanged sides of said flanged plate of said pallet.

19. A method as set forth in claim 16, further comprising the steps of:
providing a flanged plate upon the underside of said pallet; and
providing said bores within the undersurface of said flanged plate of said pallet.

20. A method as set forth in claim 12, further comprising the steps of:
providing vertically extending supports upon said conveyor;
providing bores within said supports; and
providing dependent guide pins upon said elevating plate for disposition within said bores of said supports so as to guide said elevating plate during the elevational movements thereof.

* * * * *